Oct. 12, 1937.  H. A. TEPEL  2,095,653

ELECTRIC FIXTURE

Filed Oct. 10, 1934   2 Sheets-Sheet 1

INVENTOR.
H. A. Tepel
BY Hull Brock West
ATTORNEY.

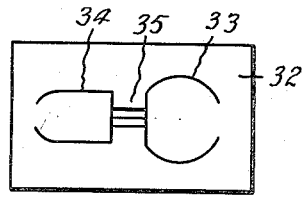 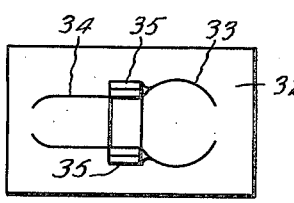 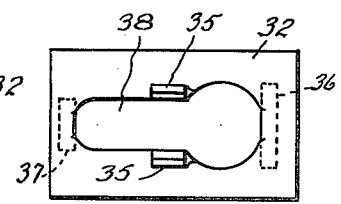
  
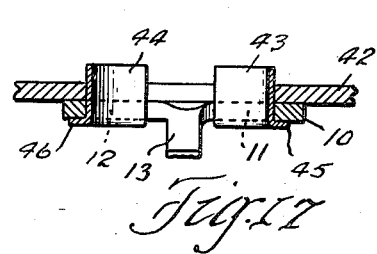 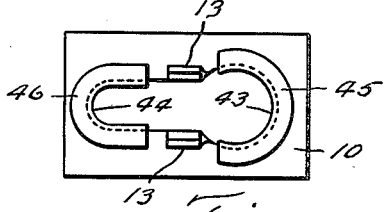
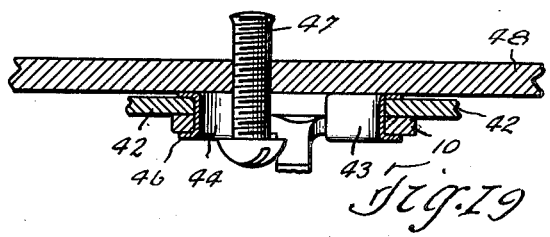
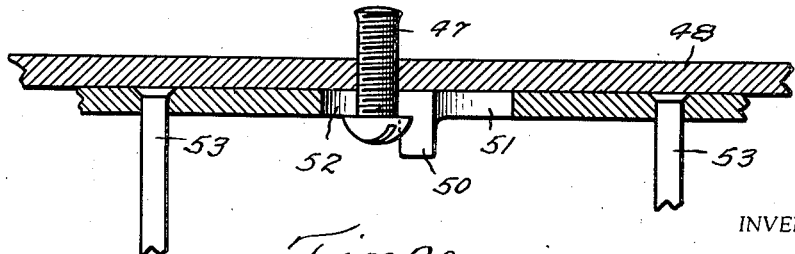

Patented Oct. 12, 1937

2,095,653

UNITED STATES PATENT OFFICE 2,095,653

ELECTRIC FIXTURE

Herman A. Tepel, Cleveland Heights, Ohio

Application October 10, 1934, Serial No. 747,763

3 Claims. (Cl. 248—343)

This invention relates to electric fixtures and particularly to a fastening or connecting means including a keyhole slot with novel means for preventing a headed fastener from becoming disengaged from such keyhole slot as a result of vibration or other accidental cause.

The principal object of the invention is to provide such fastening means provided with projections adjacent the smaller portion of the keyhole slot and adapted to prevent accidental displacement of a headed fastener received in such small portion to the larger portion of such keyhole slot in the event such screw should become loosened as a result of vibration or other cause. A further object of the invention is to provide a novel and peculiarly advantageous method of producing a device having the characteristics mentioned. A further object is to provide a plate of a limited size having therein a keyhole slot, provided with such means for preventing displacement and associated with means for attaching such plate to a portion of a fixture element provided with a keyhole slot whereby the advantageous features of the displacement preventing means may be realized in connection with fixture elements not originally provided with such displacement preventing means. A still further object is to provide for the realization of the invention in connection with fixture elements composed of materials not readily lending themselves to the incorporation of such displacement preventing means as an integral part.

Figure 1:
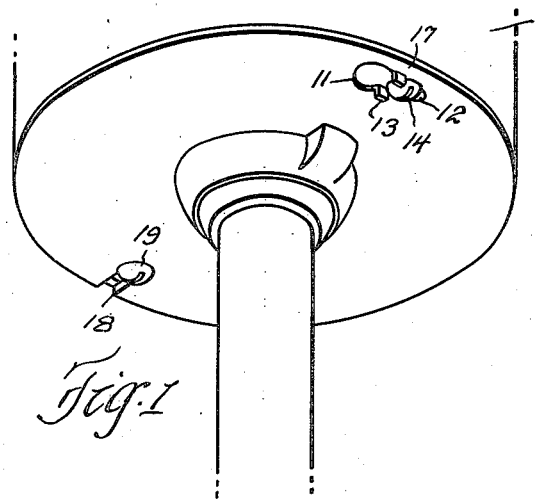
Figure 2:
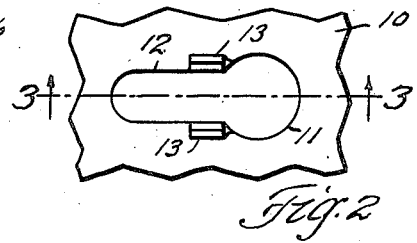
Figure 3:
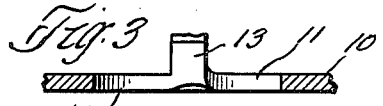
Figure 4:
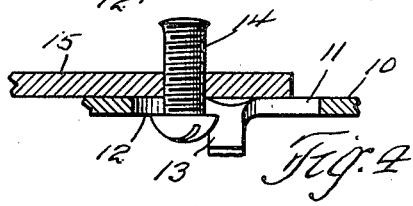
Figure 5:
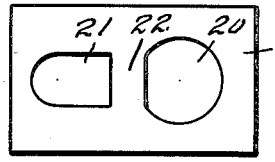
Figure 6:
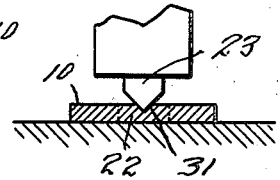
Figure 7:
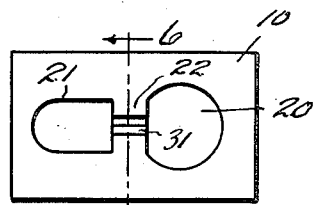
Figure 8:
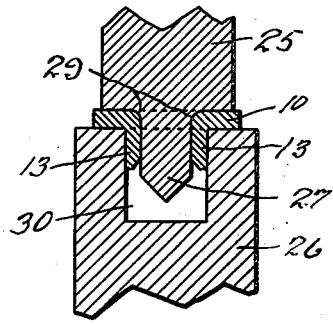
Figure 9:
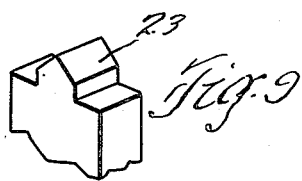
Figure 10:
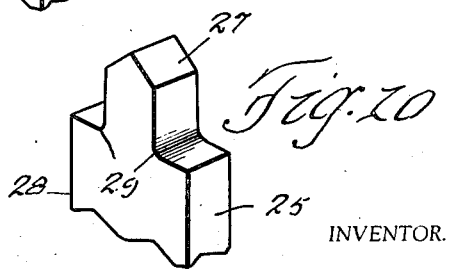

Other and more limited objects will become apparent from the following description when read in connection with the accompanying drawings in which Fig. 1 is a fragmentary perspective view illustrating a cover plate embodying one form of the invention; Fig. 2 is a fragmentary detail plan view of a piece of sheet metal having formed therein a keyhole slot and provided with the displacement preventing means; Fig. 3 is a fragmentary section taken on the line 3—3 of Fig. 2; Fig. 4 is a detail view showing the relation of the keyhole slot and displacement preventing means to a headed fastener used in connection therewith; Fig. 5 is a plan view showing the first step in the production of one form of the invention; Fig. 6 is a fragmentary view showing the second step which is the "nicking" or partial severance of the central strip from which the displacement preventing projections are formed and showing the nicking die in operative position; Fig. 7 is a plan view showing the result of the second step; Fig. 8 is a fragmentary sectional view showing the manner of bending the projections out of the plane of the sheet metal; Figs. 9 and 10 are fragmentary perspective views showing the dies used in the second and third steps; Figs. 11 to 16 inclusive are progressive views showing the formation of a modified form embodying means of attachment of a plate of limited size in which the invention is realized and in which the attaching means are struck out of the metal from which the device is formed; Fig. 17 is a sectional view showing a further modified form embodying eyelets of U-shape or part circular shape instead of the integral means of attachment; Fig. 18 is a bottom plan view of the assembly shown in Fig. 17; Fig. 19 is a sectional view showing the device of Fig. 17 completed and attached by means of the eyelets to a fixture element and secured in position by means of a headed fastener; and Fig. 20 is a view similar to Fig. 19 showing a guard element in the form of a casting substituted for the assembly of Fig. 19.

Referring now to the drawings, the numeral 10 indicates a sheet metal element which may be a portion of a fixture or a plate of limited size in which is formed a keyhole slot having a larger portion 11 and an elongated smaller portion 12 adjacent which are projections 13 which have been struck up out of the metal of the plate 10. From Figs. 2 and 3 it will be obvious that the projections 13 are of a length greater than half the distance across the smaller portion 12 of the keyhole slot adjacent which they are formed. It will be noted also that the smaller portion of the keyhole slot has been elongated beyond the length which would have been necessary in the absence of the projections 13. The length of the smaller portion 12 at the left of the projections 13 as seen in Fig. 2 must be great enough to accommodate a headed fastener 14 in said smaller portion and behind said projections 13. The end of the screw 14 is peened for the purpose of preventing complete disengagement thereof from the fixture element 15 through which it is threaded and is of a length such that when loosened as much as the peening will permit will allow the projections 13 to pass under the head of such screw. This provides for removability of the element 10 from the element 15. The length of such screw should not be much greater than minimum which will allow such removal.

Fig. 1 shows one application of the invention wherein the numeral 16 indicates any sort of fixture element requiring a cover plate 17 removably attached thereto by means of screws. The plate 17 may have a notch 18 at one side receiving a screw 19 and at the other side a keyhole slot extending in a substantially tangential direction and provided with a larger portion 11, a smaller portion 12 and projections 13. Alternatively the plate 17 may be provided with two or more keyhole slots extending tangentially in the same circumferential direction whereby rotation of the plate serves to move the same from a position at which the heads of the screws may pass through the larger ends 11 of the keyhole slots to the smaller ends 12 thereof over the projections 13.

In Figs. 5 to 10 I have disclosed a method of making the keyhole slots already described. This method is shown in connection with plates of limited size adapted for attachment to other fixture elements provided with keyhole slots but it is to be understood that the method is the same in its principal features whether it applies to small plates such as those shown or whether the invention is embodied in fixture portions of various sizes and shapes. The small plates indicated may be cut to the size shown and the keyhole slot with projections formed therein or the said slots may be formed in a strip of metal after which they are separated by means of a severing die or separated in any suitable manner. The first step in the process consists in punching holes of the shape shown at 20 and 21 leaving therebetween a strip 22 from which the projections 13 are to be formed. The second step comprises nicking the strip 22 by the action of a V-shaped die 23 while the metal is supported on a flat die 24. The result of this operation is seen in plan in Fig. 7, the element 10 thereof being shown as a section on the line 6—6 of Fig. 7 would appear. In Fig. 9 I have shown in three dimensions the appearance of the operating portion of the die 23. The next step is the formation of the projections 13 from the metal of the strip 10 by means of dies 25 and 26. The die 25 is shown in three dimensions in Fig. 10 and comprises a tongue portion 27 joined with a body portion 28 by means of curves 29 of a radius of the order of the thickness of sheet metal being operated upon. The metal 10 is placed on the die 26 with the strip 22 extending across the opening 30 which is of a width substantially equal to the width of the tongue 27 plus double the thickness of the metal 10. The tongue 27 is then forced downwardly against the resistance of the strip 22, its V-shaped point first engaging in the nicked portion 31 of the strip 22 and by continued force rupturing the remaining portion of such strip at the point 31 and stretching the metal of such strip somewhat. Continued downward motion of the die 25 results in bending the two portions of the strip 22 out of the plane of the metal and to a position outside the boundary of the keyhole slot. The metal adjacent the ends of the strip 22 is drawn and further increases the length of the resulting projections 13 so that the length of each of these projections in the finished product is considerably more than half the distance across the narrower portion 12 of the keyhole slot.

Figs. 11 to 16 show the formation of a similar plate having integral attaching means for securement to a fixture element. In this case the first step instead of punching out holes as indicated at 20 and 21 in the first form described merely scores the metal in the outlines shown at 33 and 34 in Fig. 11 and nicking the strip 35 corresponding to the strip 22 in the preceding form. The scoring may extend part way through as indicated by dotted lines in Fig. 12 or it may extend entirely through the metal. The second step shown in Figs. 13 and 14 consists in forming the projections 35 by the same means as shown in Fig. 8. The third step consists in punching out the metal within the outline of the scorings 33 and 34 respectively to form tongues 36 and 37 for attaching the plate to a fixture element having an opening provided to receive such projections and to leave an opening registering with the main outlines of the keyhole slot 38 resulting from the removal of the metal forming the projections 35 and the tongues 36 and 37. In Fig. 16 I have indicated in dotted lines a fixture element 39 to which the plate 32 may be attached by turning over the lower ends of the tongues 36 and 37 as indicated in dotted lines at 40 and 41.

In Figs. 17 to 19 I have shown an embodiment of my invention involving the attachment of small plates such as indicated in Figs. 7 and 8 to fixture elements provided originally with keyhole slots of a size to register with those in the plate by means of eyelets or partial eyelets. In Fig. 17 I have shown a plate 10 having therein a keyhole slot exhibiting the larger end 11 and smaller end 12 together with projections 13 and secured to a fixture element 42 by means of partial eyelets 43 and 44 but not yet bent or crimped over into securing position. These eyelets as seen in Fig. 18 are of U-shape and provided with flanges 45 and 46 overlying the metal of the plate 10 and fitting snugly into the respective portions of the keyhole slot. These eyelets terminate a sufficient distance from the projections 13 to permit easy insertion and to avoid interference with the function of such projections. The eyelets are preferably made of quite thin metal, having sufficient extent that no great rigidity is required for performing the securing function. These eyelets are also preferably made of soft metal such as copper or some suitable alloy or thin sheet metal coated with tin or similar soft metal having sufficient tensile strength to perform the securing function and being sufficiently soft as not to injure porcelain or glass in the event the plate 10 should be secured to fixture elements composed of such material. The upper edges of the eyelets 43 and 44 as seen in Fig. 17 are bent over into contact with the element 42, which, as indicated, may be composed of porcelain or other enameled metal or glass or any other material whereby to secure the plate 10 to such element. The assembly of Fig. 17 with the eyelets bent over is shown in Fig. 19 secured by means of a screw 47 to a fixture element 48 upon which the element 42 which may be for example a reflector is supported. The relation of the length of the screw 47 to the projection 13 should be the same as previously described. An organization such as shown in Fig. 19 lends itself readily to interchangeable use with a guard element consisting of a ring 49 having a plurality of keyhole slots provided with projections 50 related to the large and small keyhole slot openings 51 and 52 in the same manner as indicated in Fig. 2 but formed as a casting and having attached thereto rod or wire guard elements 53 forming a basket-like guard which may enclose a lamp. It will be obvious that it may become necessary or desirable to substitute guard assemblies such as indicated for reflector assemblies such as indicated in Fig. 19 and vice versa and that this construction lends itself readily to such interchangeable use.

While I have shown and described the present preferred embodiments of my invention I wish it understood that the same is not limited to the details shown and described but only in accordance with the scope of the appended claims and the prior art.

Having thus described my invention, what I claim is:

1. In a fixture, a sheet metal element having a keyhole slot formed therein and a pair of opposed projections extending outwardly from the plane thereof and adjacent the edges of the smaller portion of said keyhole slot and spaced from the end of said smaller portion a distance sufficient to accommodate the head of a screw in said smaller end of said keyhole slot and contacting the surface of said element, said projections being integral with said sheet metal element and of a length greater than half the distance across said smaller end of said keyhole slot, said sheet metal element being of limited extent, in combination with another element having a flat portion with a keyhole slot therein and means securing said sheet metal element to said flat portion with said keyhole slots in registration.

2. In a fixture, a sheet metal element having a keyhole slot formed therein and a pair of opposed projections extending outwardly from the plane thereof and adjacent the edges of the smaller portion of said keyhole slot and spaced from the end of said smaller portion a distance sufficient to accommodate the head of a screw in said smaller end of said keyhole slot and contacting the surface of said element, said projections being integral with said sheet metal element and of a length greater than half the distance across said smaller end of said keyhole slot, said sheet metal element being of limited extent, in combination with another element having a flat portion with a keyhole slot therein and means securing said sheet metal element to said flat portion with said keyhole slots in registration, said means consisting of tongue means struck out of the metal of said plate-like element and extending through the keyhole slot in said flat portion and bent over the edge thereof.

3. In a fixture, a sheet metal element having a keyhole slot formed therein and a pair of opposed projections extending outwardly from the plane thereof and adjacent the edges of the smaller portion of said keyhole slot and spaced from the end of said smaller portion a distance sufficient to accommodate the head of a screw in said smaller end of said keyhole slot and contacting the surface of said element, said projections being integral with said sheet metal element and of a length greater than half the distance across said smaller end of said keyhole slot, said sheet metal element being of limited extent, in combination with another element having a flat portion with a keyhole slot therein and means securing said sheet metal element to said flat portion with said keyhole slots in registration, said means including eyelet means extending through said keyhole slots and bent over the edge thereof.

HERMAN A. TEPEL.